Jan. 2, 1934. J. H. GRAYSON 1,941,795
THERMOSTAT
Filed May 31, 1932 2 Sheets-Sheet 1
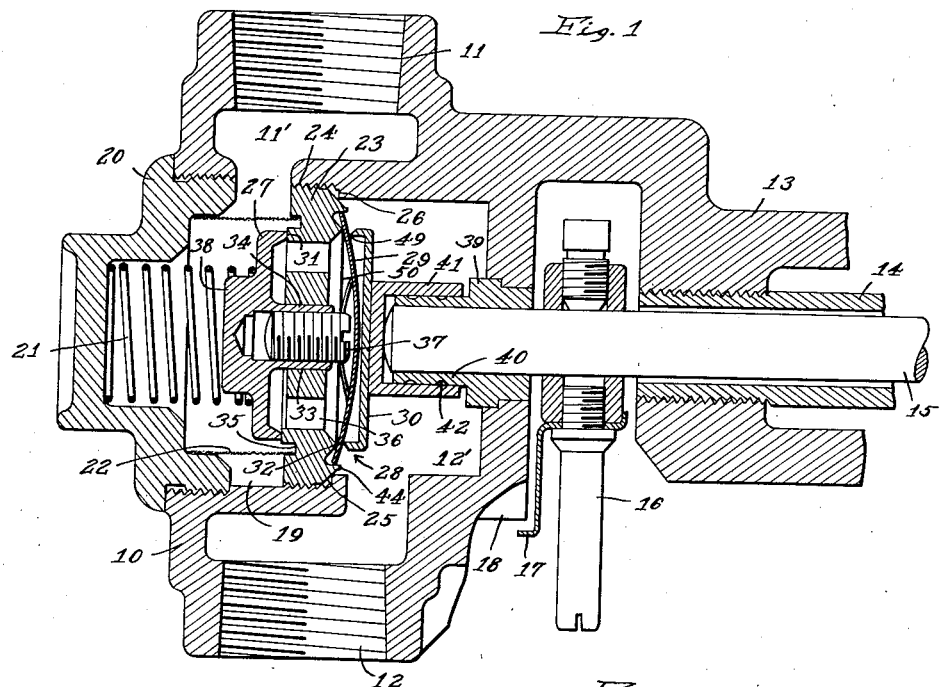
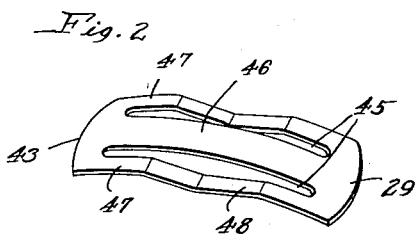
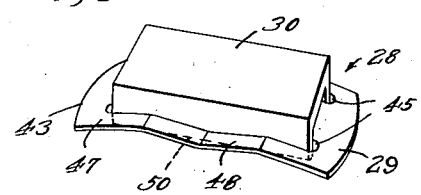
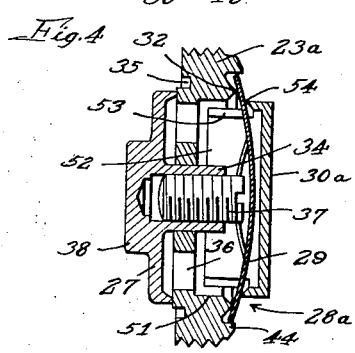
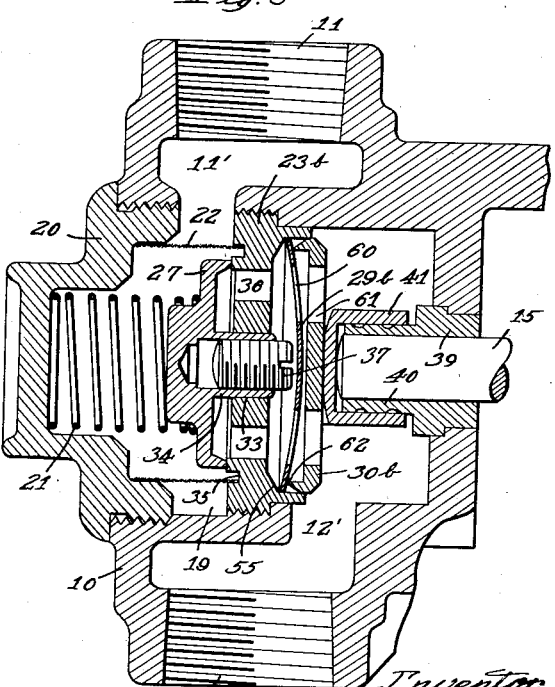
Inventor:
John H. Grayson
By
Wilson, Dowell, McCanna & Rehm
Attys.

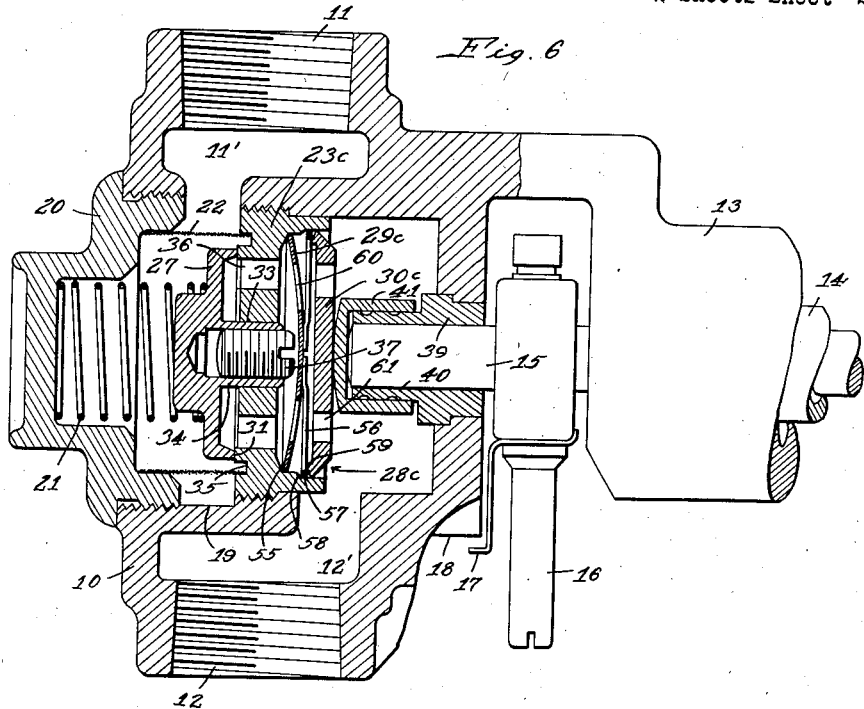
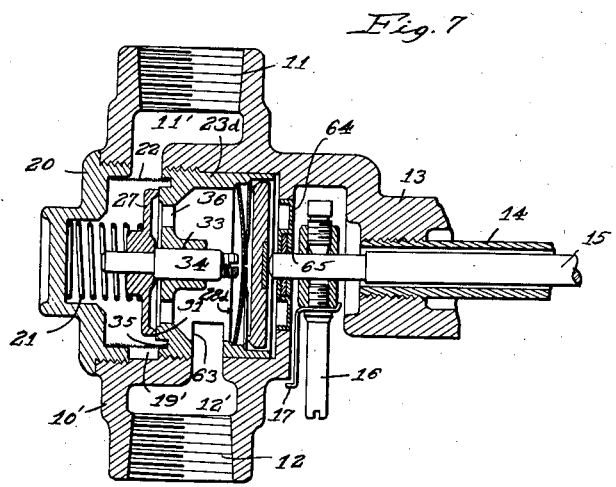

Patented Jan. 2, 1934

1,941,795

UNITED STATES PATENT OFFICE 1,941,795

THERMOSTAT

John H. Grayson, Lynwood, Calif., assignor to Grayson Appliance Co. Ltd., Lynwood, Calif., a corporation of California Application May 31, 1932. Serial No. 614,397

6 Claims. (Cl. 236—48)

This invention relates to thermostats generally, but is particularly concerned with one designed and adapted for controlling the gas supplied to a storage type water heater.

The principal object of my invention is to provide a thermostat of simple, compact and economical construction, in which the entire working unit, including the snap-action mechanism, is adapted for easy removal and replacement, for purposes of inspection and cleaning, or substitution of a new unit or part thereof.

Other objects will appear in the course of the following detailed description, in which reference is made to the accompanying drawings, wherein—

Figure 1 is a central longitudinal section through a thermostat embodying my invention;

Fig. 2 is a perspective view of the snap-action element appearing in section in Figure 1;

Fig. 3 is a similar view showing how the push member fits thereon;

Fig. 4 is a section of a complete working unit removed from the thermostat, but showing a modified form of push member;

Fig. 5 is a view similar to Figure 1, but showing a modified form of snap-action mechanism;

Fig. 6 is another section similar to Fig. 5, but showing a further modification of the snap-action mechanism, and Fig. 7 shows another modified construction.

Similar reference numerals are applied to corresponding parts throughout the views.

This application is a continuation in part of my application, Serial No. 510,075, filed January 21, 1931.

Referring to Figure 1, the numeral 10 designates the body or casing for the thermostat having an inlet 11 and outlet 12 into which gas supply and delivery pipes are arranged to be threaded, the delivery pipe extending to the main burner of the water heater or other gas appliance in connection with which the thermostat is used. It is also common practice to provide a tube communicating with the inlet to deliver gas to a pilot burner associated with the main burner. A boss 13, suitably formed integral with the body 10, serves to mount the thermostat in the wall of the tank, the extremity of the boss being usually threaded for that purpose. A thermostat, consisting of a tube 14 and rod 15, is mounted in the boss 13 and extends therefrom into the tank of the heater so as to be governed by the temperature of the water. The tube 14 is of copper or other material having a high coefficient of expansion, whereas the rod 15 is of invar or any other suitable material substantially free from expansion and contraction with temperature change. The tube has a plug in its outer end into which the outer end of the rod is threaded so as to move the rod inwardly upon contraction of the tube resulting from a drop in temperature, and the rod moves outwardly when the tube expands with a rise in temperature. The threaded connection between the rod and tube is a well-known expedient, and it is common practice to take advantage of this threaded connection for a temperature adjustment of the thermostat. Thus, I have shown a lever 16 fastened onto the rod between the body 10 and boss 13 for turning the rod in either direction according to the adjustment desired. A pointer 17 is moved with the lever relative to a surface 18 on the body 10 bearing a suitable temperature scale. The construction thus far described is purely conventional, and no invention is claimed thereon, excepting only in so far as the element referred to cooperate with the rest of the structure which will now be described.

The inside of the body 10 is partitioned to provide inlet and outlet chambers 11' and 12', respectively, in communication with the inlet 11 and outlet 12 previously mentioned, and a cylindrical bore 19, substantially concentric with the thermostatic elements 14 and 15, connects said chambers. A cap 20 is threaded, as shown, into one end of the bore 19 to serve as a closure, as well as an abutment for one end of a coiled compressed spring 21 and a tubular strainer 22. A bushing 23 is threaded as at 24 in the other end of the bore 19 and has a tapered inner end 25 arranged to jam against the annular shoulder 26 defining the inner end of the bore when the bushing is threaded home, whereby to prevent leakage around the bushing into the outlet chamber. The bushing 23, together with the valve 27 and the snap-action mechanism 28, consisting of the snap-action element 29 of spring material and its cooperating push member or plunger 30, forms what I choose to call the working unit of the thermostat. This working unit, in accordance with my invention, is demountable from the thermostat for purposes of inspection and cleaning, and to permit replacement of any part thereof, if this is necessary. The bushing 23 serves a four-fold purpose; it provides a valve seat 31 on one side, a support 32 on the other side for the snap-action mechanism 28, a guide 33 for the valve stem 34, and an annular seat 35 for the inner end of the strainer 22. A series of holes 36 is provided in the bushing in a circle circumscribed by the seat 31 for the passage of gas from the inlet chamber into the outlet chamber when the valve 27 is opened. A screw 37 is threaded in and projects from the end of the stem 34 of the valve to permit adjustment with respect to the snap-action mechanism 28, so that the valve will be opened when the snap action occurs, and not before. The adjustment of the screw also regulates the extent to which the valve will be opened. A cylindrical boss 38 formed on the back of the valve 27 is received in the inner end of the spring 21 and keeps the spring properly located, thereby facilitating assembling. Leaving for later the discussion of the novel details of the snap-action mechanism 28, it will be seen that removal of the cap 20 affords access to the working unit which can then be easily removed with a suitable spanner wrench arranged to be entered in the holes 36. If desired, facets could be provided in or on the back of the bushing for the special purpose of threading the same into or out of the bore. Manifestly, when the cap is removed, the strainer 22 can be withdrawn for cleaning and the valve 27 also, without having to remove the rest of the working unit, the valve seat 31 being easily accessible from the outside under such circumstances to permit cleaning thereof with the bushing in place. This is, of course, quite an advantage, because the most common service troubles are caused by dirty gas resulting in coating or corrosion of the valve and valve seat, and clogging of the strainer, and it is usually simply a matter, therefore, of cleaning these parts. However, if any trouble develops in the snap-action mechanism, the demountability of the working unit as a whole by simply removing the bushing 23 is advantageous, because it permits the user or service man to replace any one or more of the parts, or the entire working unit, without removing the thermostat from the heater.

The snap-action mechanism 28, as indicated above, comprises a snap-action element 29 of spring material and a push member 30 cooperating therewith. The element 29 and its cooperating push member 30 form the subject matter of a copending application filed in the name of Franz Netschert, Serial No. 612,486, filed May 20, 1932, and, as clearly appears in Fig. 2, are of elongated substantially rectangular form with the ends arcuate, as appears at 43, to conform to the inside of the annular rim 44 on the bushing 23, circumscribing the annular knife edge support 32 for the snap-action mechanism. The element 29 is slotted longitudinally as at 45 so as to define a middle longitudinal rib 46 and side longitudinal ribs 47. The element is bowed longitudinally, as clearly appears in Figs. 1 and 2, and the side ribs each have a slight crimp 48 therein between the ends thereof, so that the side ribs are slightly shortened compared to the middle rib. It is immaterial how this difference in length between the ribs is secured so long as the length of the middle rib is increased relative to the length of the side ribs, without any change in the overall length of the element. For instance, it has been found that by peening the middle rib of an element sufficiently to stretch the metal to make the middle rib longer than the side ribs, a very practical snap-action element can be secured. The theory of operation of this sort of snap-action element is this: When the element is supported at its opposite ends as at 32 and pressure is applied to the element by the push member 30 near the points of end support, as shown in Figure 1, the middle rib 46 of the element will be straightened out more and more as it approaches dead center, thereby causing the side ribs to stretch proportionately in an effort to equal the length of the middle rib. The moment, however, that the middle rib is moved slightly past dead center, the side ribs contract, the stretch therein being relieved, and the middle rib accordingly snaps to reversed curvature. Due, however, to the longitudinal curvature of the element and its resistance to straightening, the element normally assumes the shape shown in Figure 1, that is to say, as soon as the pressure which caused it to snap over dead center is relieved, the element snaps back to its normal curvature. The push member 30, as clearly appears in Fig. 3, is of elongated substantially rectangular form and has knife edges 49 on its opposite ends to bear on the snap-action element 29 near the points of end support 32. Longitudinal side flanges 50 are also provided on the push member to enter the slots 45, whereby to locate the push member on the snap-action element.

In operation, it should be clear from the foregoing that as the water in the tank drops in temperature, the consequent contraction of the tubular element 14 causes inward movement of the rod element 15, thereby moving the push member 30 toward the bushing 23. Eventually, when there has been a predetermined movement of the rod element 15, the snap-action element 29 is snapped over dead center and opens the valve 27 by engagement of the middle rib 46 with the end of the screw 37 on the valve stem. The burner is, therefore, thrown into operation to heat the water in the tank. The rise in temperature of the water causes expansion of the tubular element 14 and accordingly outward movement of the rod element 15. When there has been a predetermined movement of the rod element, the snap-action element 29 snaps back to its normal curvature, thereby permitting the valve 27 to close under action of its spring 21. Adjustment of the thermostat by means of the lever 16 determines the approximate temperature at which the water in the tank will be maintained.

Fig. 4 illustrates a slightly modified form of bushing 23a in which a cylindrical bore 51 is provided to serve as a guide for the push member 30a of the snap-action mechanism 28a. The snap-action element 29 used in this construction is like the one above described, being arranged to rest on the annular knife edge support 32 near its opposite ends, and fit within the annular rim 44 of the bushing. The push member 30a, however, unlike the push member 30, is of circular form and provided with a circular flange 52 arranged to have a working fit in the bore 51 to permit reciprocation of the push member freely with respect to the bushing. The flange 52 has slots 53 provided therein at diametrically opposite sides of the push member, wide enough to accommodate the snap-action element 29, and knife edges 54 are formed on the push member at the bottom of these slots, for engagement with the snap-action element at points spaced a predetermined distance inwardly from the end of supports 32. The slots 53 allow the gas to flow freely from the inlet to the outlet chamber when the valve 27 is opened but if desired, additional holes can be provided in the flange 52 to prevent any restriction to gas flow. The operation of this working unit is the same as the one above described.

In Figs. 5 and 6, I have illustrated working units similar to the one disclosed in my copending application above referred to, but, of course, used in a thermostat made as a separate and distinct unit from the burner in connection with which the same is used. The working unit of Fig. 6 consists of a bushing 23c threaded in place in the bore 19 like the bushing 23 or 23a. The bushing provides a valve seat 31 for the valve 27, a guide 33 for the valve stem 34, a seat 35 for the strainer 22, and a supporting shoulder 55 for the snap-action element 29c of the snap-action mechanism 28c. The latter is similar to the mechanism covered in my Patent #1,744,465, the element 29c being a circular diaphragm of spring material normally of convexo-concave form and resting on the shoulder 55, resilient levers 56 suitably formed integral with a ring 57 resting on another shoulder 58 on the bushing, and a push member or plunger 30c having an annular shoulder 59 on the face thereof bearing against the back of the levers near the outer ends thereof. The levers 56 are disposed substantially radially and project toward each other from diametrically opposed points on the ring 57, and have the inner ends bearing against the center of the snap-action element 29c, whereby to force the latter over dead center in a predetermined movement of the push member to open the valve 27 abruptly. In keeping with the disclosure in the aforesaid application, holes 60 are provided in the snap-action element 29c and holes 61 in the push member 30c so that gas can flow through the bushing from the inlet chamber 11' to the outlet chamber 12' when the valve 27 is opened. It is no doubt clear that the working unit is easily removable and replaceable for inspection and cleaning, or substitution of one or more new parts for any which may prove faulty, thereby avoiding the necessity for removing the thermostat from the water heater.

The working unit disclosed in Fig. 5 is the same as that of Fig. 6, except for the omission of the levers 56 and ring 57. The bushing 23b, therefore, requires only the one shoulder 55 for support of the snap-action diaphragm element 29b. The push member or plunger 30b of this working unit has an annular shoulder 62 in direct engagement with the element 29b near the outer supported edge thereof, and the push member is guided like the push member 30c in the rim of the bushing so as to keep it in concentric relation to the snap-action element. The holes 60 and 61 provided in the snap-action element and push member, respectively, permit unrestricted flow of gas from the inlet chamber 11' to the outlet chamber 12' when the valve 27 is opened.

In Fig. 7 I have shown the embodiment of the present invention in a thermostat somewhat similar to that disclosed in my Patent #1,781,328. The sliding cap seat 41 is eliminated and the body 10' is constructed to provide a bore 19' threadedly receiving an elongated bushing 23d. The latter provides at one end thereof a seat 31 for the valve 27 and a guide 33 for the valve stem 34, and also the holes 36 for the flow of gas into the bushing from the inlet chamber 11' when the valve 27 is opened. The snap-action mechanism 28d is carried on the other end of the bushing, and a slot 63 is provided in the wall of the bushing between the ends thereof for the flow of gas to the outlet chamber 12'. The snap-action mechanism 28' is the same as the mechanism 28c, except, of course, that the holes 60 and 61 in the snap-action element and push member, respectively, are omitted, there being no flow of gas through the snap-action mechanism. A plate 64 with a suitable stuffing box 65 thereon affords a seal where the rod 15 extends into the body 10' to operate the snap-action mechanism. The operation of the working unit illustrated in this figure is substantially the same as the others, and it should be also clear that the unit can easily be removed and replaced for inspection and cleaning, or substitution of new parts for any of the original parts which may prove faulty.

It is believed the foregoing description conveys a good understanding of all of the objects and advantages of my invention. The appended claims have been drawn so as to cover all legitimate modifications and adaptations.

I claim:

1. In combination with a casing and a relatively movable rod projecting into said casing, a stuffing box comprising a bushing mounted on the wall of said casing surrounding the end of said rod, and a slidable cap enclosing the inner end of said rod and movable therewith, said cap having a close working fit on the aforesaid bushing.

2. In combination with a casing and a relatively movable rod projecting into said casing, a stuffing box comprising a stationary body portion on the wall of said casing having the end of said rod movable therein with a close working fit, and a slidable cap enclosing the inner end of said rod and movable therewith, said cap having a close working fit on the neck provided on the body portion.

3. In a device of the class described comprising a casing, a valve in said casing to be opened and closed in accordance with temperature change to control communication between inlet and outlet chambers provided in said casing, and a thermostat mounted on said casing and comprising a stationary tubular element fixed with relation to the wall of said casing, and a movable rod element therein extending into said casing into one of the chambers therein, means providing an operating connection between the movable rod element of the thermostat and the aforesaid valve comprising a sliding cap enclosing the inner end of said rod and movable therewith, and a stationary neck surrounding the inner end of said rod element and having said cap telescoping thereon with a close working fit.

4. In a device of the class described comprising a casing, a valve in said casing to be opened and closed in accordance with temperature change to control communication between inlet and outlet chambers provided in said casing, a thermostat mounted on said casing and comprising a stationary tubular element fixed with relation to the wall of said casing, and a movable rod element therein extending into said casing into one of the chambers therein, and an over-center snap-action element of spring material supported in said casing between the valve and movable rod element and arranged to be forced over dead center in a predetermined movement of said rod element so as to operate the valve abruptly, a sliding cap enclosing the inner end of said rod element and movable therewith, a stationary neck projecting from the wall of the casing around the inner end of said rod element and having said cap telescoping thereon with a close working fit, and a push member engaging the aforesaid snap-action element and held in operative relation thereto by the sliding cap, the push member being movable with the rod element through the medium of said cap, whereby to force the snap-action element over dead center.

5. The combination set forth in claim 2 including in the joint between the cap and neck one or more annular grooves in one of the relatively movable parts adapted to contain lubricant substantially as and for the purpose described.

6. A device as set forth in claim 3 including in the joint between the neck and cap one or more annular grooves in one of the relatively movable parts adapted to contain lubricant substantially as and for the purpose described.

JOHN H. GRAYSON.